(12) United States Patent
Abousleman

(10) Patent No.: US 6,535,647 B1
(45) Date of Patent: Mar. 18, 2003

(54) IMAGE ENCODER METHOD

(75) Inventor: Glen Patrick Abousleman, Scottsdale, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 0 days.

(21) Appl. No.: 09/276,588

(22) Filed: Mar. 25, 1999

(51) Int. Cl.$^7$ ................................................. G06K 9/36
(52) U.S. Cl. ........................ 382/253; 382/240; 382/248
(58) Field of Search ........................ 382/232, 233–235, 382/238–251, 191, 253; 375/265, 240–240.25; 358/261.2–261.3; 348/400.1–414.1

(56) References Cited

U.S. PATENT DOCUMENTS

| | | | | |
|---|---|---|---|---|
| 6,038,344 A | * | 3/2000 | Palmadesso et al. | ........ 382/191 |
| 6,075,891 A | * | 6/2000 | Burman | ....................... 382/191 |
| 6,192,158 B1 | * | 2/2001 | Abousleman | ............... 382/240 |

OTHER PUBLICATIONS

Abousleman, et al Entropy–constrained predictive trellis coded quantization application to hyperspectral image compression; Acoustics, Speech, and Signal Processing. IEEE 1994.*

Abousleman "compression of hyperspectral imagery using hybrid DPCM/DCT and entropy–constrained trellis coded quantization" Proc. Data Compression Conference, 1995, p. 322–331, Mar. 1995.*

Kasner et al. "Adaptive wavelet coding of images" Proc. International Conference on Image Processing, vol. 3, pp. 358–362, Nov. 1994.*

Zhang et al. "A new adaptive classified transform coding method" International Conference on Acoustic, Speech, and Signal Processing, vol. 3, pp. 1835–1837, May 1989.*

An article entitled "Optimum Quantizer Performance For A Class Of Non–Gaussian Memoryless Sources", by N. Farvardin and J.W. Modestino from IEEE Trans. Inform. Th., vol. 30, May 1984.

An article entitled "Compression Of Hyperspectral Imagery Using the 3–D DCT and Hybrid DPCM/DCT" by G.P. Abousleman, M.W. Mardellin and B.R. Hunt from IEEE Trans. Geoscience And Remote Sensing, vol. 33, Jan. 1995.

An article entitled "Adaptive Wavelet Coding Of Hyperspectral Imagery" by G.P. Abousleman from Wavelet Applications III, H. Szu, Editor, Proc. SPIE 2762, 1996.

An article entitled "Hyperspectral Image Compression Using Entropy–Constrained Predictive Trellis Coded Quantization" by G.P. Abousleman, M.W. Marcellin and B.R. Hunt, from IEEE Trans. Image Proc., vol. IP–6, Apr. 1997.

An article entitled "Entropy–Constrained Vector Quantization" by P.A. Chou, T. Lookabaugh and R.M. Gray from IEEE Trans. Acoust., Speech, and Signal Proc., vol. 37, Jan., 1989.

An article entitled "Imaging Spectrometry For Earth Remote Sensing", by A.F.H. Goetz, G. Vane, J.E. Solomon and B.N. Rock from Science, vol. 228, Jun. 1985.An article entitled "High Resolution Imaging Spectometer (HIRIS)–A Major Advance In Imaging Spectometry" by D. Rockey from Imaging Spectoscopy Of The Terrestrial Environment, G. Vane, Editor, Proc. SPIE 1298, 1990.

(List continued on next page.)

Primary Examiner—Jingge Wu
(74) Attorney, Agent, or Firm—Jenner & Block, LLC

(57) ABSTRACT

A system is presented for compression of hyperspectral imagery. Specifically, DPCM is used for spectral decorrelation, while an adaptive 2-D discrete cosine transform (DCT) (22) coding scheme is used for spatial decorrelation. Trellis coded quantization (23) is used to encode the transform coefficients. Side information and rate allocation strategies (36) are discussed. Entropy-constrained codebooks are designed using a modified version of the generalized Lloyd algorithm

20 Claims, 5 Drawing Sheets

OTHER PUBLICATIONS

An article entitled "Trellis Coded Quantization Of Memoryless and Gauss–Markov Sources" by M.W. Marcellin and T.R. Fischer from IEEE Trans. Commun., vol. COM–38, Jan., 1990.

An article entitled "The Viterbi Algorithm", by G.D. Forney, Jr., from Proc. IEEE, vol. 61, Mar., 1973.

An article entitled "On Entropy–Constrained Trellis Coded Quantization", by M.W. Marcellin from IEEE Trans. Commun., vol. 42, Jan., 1994.

An article entitled "Entropy–Constrained Trellis Coded Quantization", by T.R. Fischer and M. Wang from IEEE Trans. Inform. Th., vol. 38, Mar., 1992.

An article entitled "Fundamentals Of Digital Image Processing" by A.K. Jain from Englewood Cliffs, N.J.: PrenticeHall, 1989.

An article entitled Digital Image Processing by R. C. Gonazlez and P. Wintz from Reading, MA: Addison Wesley 1989.

An article entitled "Digital Coding Of Waveforms" by N.S. Jayant and P. Noll, Englewood Cliffs, NJ: Prentice–Hall, 1984.

An article entitled "Subband Image Coding", by J.W. Woods, Boston, MA: Kluwer Academic Press, 1991.

An article entitled "Motion–Compensated Wavelet Transform Coding For Color Video Compression", by Y.Q. Zhang and S. Zafar, from IEEE Trans. Circuits And Systems For Video Technology, vol. 2, Sep. 1992.

An article entitled "Multiscale Video Representation Using Multiresolution Motion Compensation and Wavelet Decomposition" X.Zaver, Y. Zhang and B.J. Jabbari, from IEEE J. Selected Areas In Commun., vol. 11, Jan., 1993.

An article entitled A System Overview Of The Airborne Visible/Infrared Imaging Spectrometer (A VIRIS), by W.M. Porter and H. T. Enmark from Imaging Spectroscopy II, G. Vane, Editor, Proc. SPIE 834, 1987.

An article entitled "Optimum Classification In Subband Coding Of Images", by R.L. Joshi, T.R. Fischer and R.H. Bamberger, from Proc. International Conference On Image Processing, Nov. 1994.

An article entitled "Transform Coding Of Monochrome and Color Images Using Trellis Coded Quantization", by M.W. Marcellin, P. Sriram and K. Tong from IEEE Trans. Circuits and Systems For Video Technology, vol. 3, Aug. 1993.

An article entitled "Efficient Bit Allocation For An Arbitrary Set Of Quantizers", by Y. Shoham and A. Gersho from IEEE Trans. Acoust., Speech, and Signal Proc., vol. 36, Sep. 1988.

An article entitled "Optimum Quantizer Performance For A Class Of Non–Gaussian Memoryless Sources", by N. Farvardin and J.W. Modestino from IEEE Trans. Inform. Th., vol. 30, May 1984.

An article entitled "Compression Of Hyperspectral Imagery Using The 3–D DCT and Hybrid DPCM/DCT" by G.P. Abousleman, M.W. Mardellin and B.R. Hunt from IEEE Trans. Geoscience And Remote Sensing, vol. 33, Jan. 1995.

An article entitled "Adaptive Wavelet Coding Of Hyperspectral Imagery" by G.P. Abousleman from Wavelet Applications III, H. Szu, Editor, Proc. SPIE 2762, 1996.

An article entitled "Hyperspectral Image Compression Using Entropy–Constrained Predictive Trellis Coded Quantization" by G.P. Abousleman, M.W. Marcellin and B.R. Hunt, from IEEE Trans. Image Proc., vol. IP–6, Apr. 1997.

An article entitled "Entropy–Constrained Vector Quantization" by P.A. Chou, T. Lookabaugh and R.M. Gray from IEEE Trans. Acoust., Speech, and Signal Proc., vol. 37, Jan., 1989.

* cited by examiner

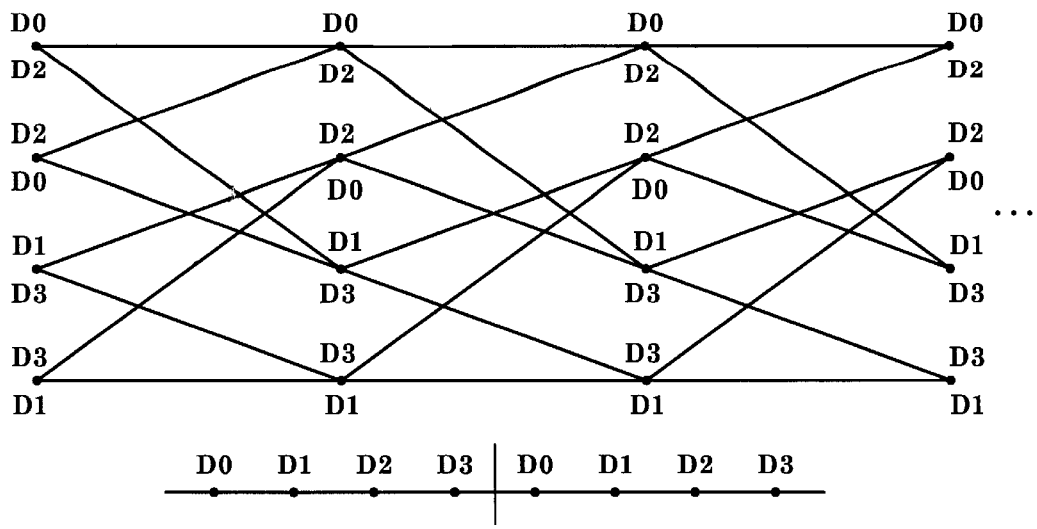
*- PRIOR ART -* FIG. 1
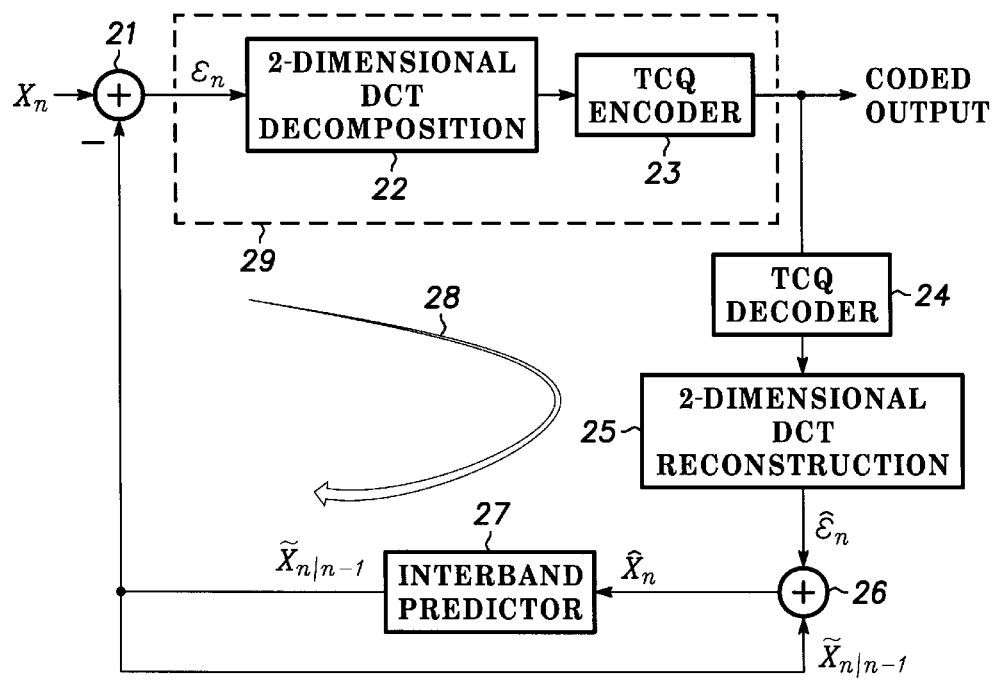
FIG. 2

IMAGE ENCODER METHOD

BACKGROUND OF THE INVENTION

The present invention pertains to image processing and more particularly to a method for compressing hyperspectral imagery.

In recent years, there has been increased interest in the field of remote sensing to perform precise recording of sensed energy in a number of narrow wavelength slices. Since various surface materials of interest have absorption features that are only 20 to 40 nm wide, the ability to discriminate among such features on the Earth's surface requires sensors with very high spatial, spectral, and radiometric sensitivity.

The next generation of satellite-based imaging systems will be capable of sensing scene radiation in hundreds of distinct wavelength regions. The High-Resolution Imaging Spectrometer (HIRIS), is an example of future high-resolution multi-band spectrometers. HIRIS can collect 192 spectral bands in the 0.4 to 2.5 $\mu$m wavelength region, with each band being on the order of 1000×1000 pixels. Combining these parameters with a radiometric sensitivity of 12 bits would produce a single hyperspectral image which comprises several hundred megabytes of digital information.

HIRIS is exemplary of the characteristics of future fine-spectral-resolution image sensors. The volume of data in such images requires fundamental rethinking of many image processing operations that have been developed for panchromatic and even low-dimensional multispectral data. A property of fine-spectral-resolution imagery is interband correlation. It is easy to observe in even coarse-band imagery, such as Landsat multispectral or three-primary color images, that many features of edge definition, contrast, texture, gray-level, etc., remain substantially the same from spectral band to spectral band. The interband correlation facilitates substantial reduction of the data required for storing and/or transmitting such imagery.

However, a careless approach to reducing the correlation could lead to disastrous loss of the information differences between bands that are the critical value of multispectral imagery. An improper reduction of correlation redundancy could make it impossible to exploit the imagery for significant utility.

Accordingly, it would be desirable to have a method for compressing hyperspectral imagery for storage and transmission.

BRIEF DESCRIPTION OF THE DRAWINGS

FIG. 1 is a diagram illustrating a trellis for performing trellis coded quantization;

FIG. 2 is a block diagram illustrating a hyperspectral image encoder in accordance with one embodiment of the present invention;

DESCRIPTION OF THE PREFERRED EMBODIMENT

Figure 3:
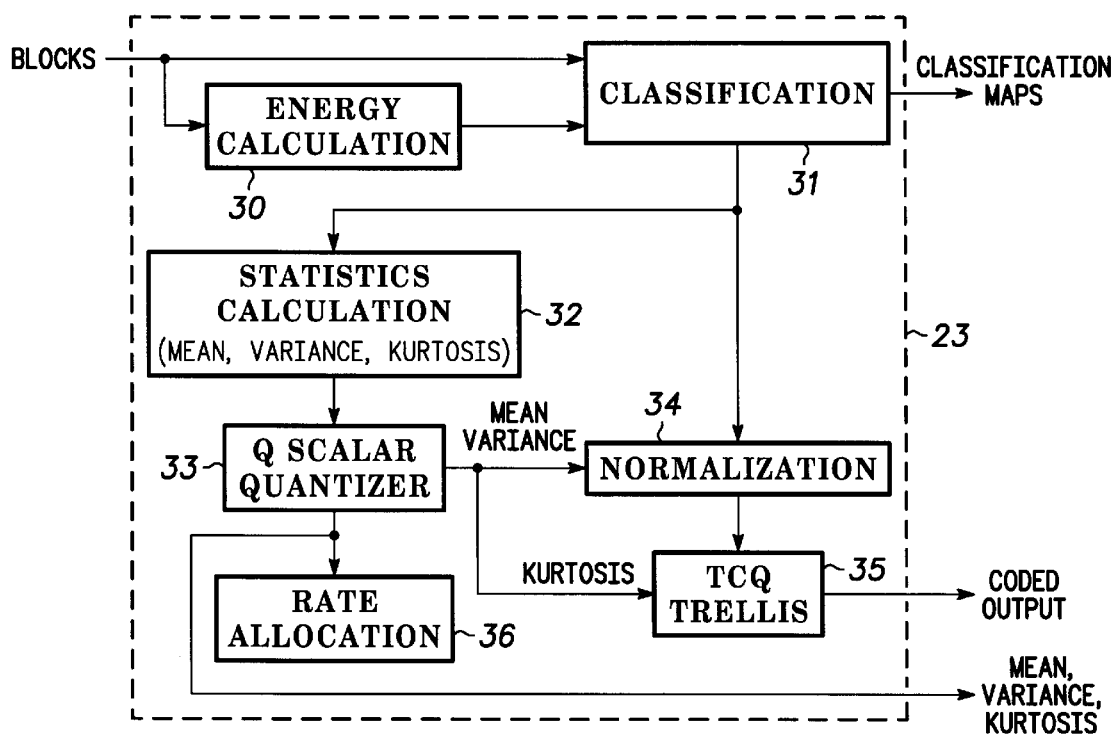
FIG. 3 is a block diagram illustrating a trellis coded quantization (TCQ) encoder in accordance with one embodiment of the present invention.

The present invention provides for substantial compression of the hyperspectral imagery while at the same time providing moderate complexity and maximum fidelity of the reconstructed imagery.

The present invention relates to a system for compressing hyperspectral imagery. In one aspect of the present invention, a system is provided for compressing hyperspectral imagery using a hybrid DPCM/DCT configuration whereby DPCM is used in the spectral dimension and each error image is coded using an adaptive 2-D DCT coder. In a preferred embodiment, the error image is divided into non-overlapping 8×8 blocks and transformed using the DCT. Each block is classified into one of a number of classes (e.g., two classes) by maximizing the coding gain. All resulting sequences are quantized using, for example, entropy-constrained trellis coded quantization (ECTCQ). This entropy constrained system achieves a compression ratio of greater than 70:1 with an average PSNR of the coded hyperspectral sequence approaching 41 dB.

In the preferred embodiment, quantization codebooks are optimized for different generalized Gaussian distributions. Codebook design uses a modified version of the generalized Lloyd algorithm in a training-sequence-based iterative scheme. Rate allocation is performed in an optimal fashion by an iterative technique that uses the rate-distortion performance of the various trellis-based quantizers.

Trellis Coded Quantization (TCQ) methods were developed in Trellis Coded Quantization of Memoryless and Gauss-Markov Sources by Marcellin et al., IEEE Trans. Commun., vol. COM-18, January 1990, which is hereby incorporated by reference. FIG. 1 illustrates a typical TCQ trellis for performing quantization. For encoding a memoryless source at R bits per sample, a codebook of size $2^{R+1}$ is partitioned into four subsets, each containing $2^{R-1}$ codewords. These subsets are labeled D0, D1, D2, and D3, and are used as labels for the branches of a suitably chosen trellis. An example is shown in FIG. 1 for R=2.

Sequences of codewords that can be produced by the TCQ system are those that result from walks along the trellis from left to right. For example, if beginning in the top left state of the trellis in FIG. 1, the first codeword must be chosen from either D0 or D2. If a codeword from D2 is chosen, then we walk along the lower branch (shown with a heavy line) to the second state from the bottom, at which we must choose a codeword from either D1 or D3.

Note that at each step in the encoding, the codeword must be chosen from either A0=D0∪D2 or A1=D1∪D3. Each of these supersets contains $2^R$ codewords and hence, given an initial trellis state, the sequence of selected codewords can be transmitted using one R-bit label for each sample.

Given an input data sequence x1, x2, . . . , the best (minimum mean-squared-error) allowable sequence of codewords is determined as follows. For the $i^{th}$ stage in the trellis (corresponding to $x_i$), the best codeword in the $j^{th}$ subset (j=0, 1, 2, 3), say $c_j$, is chosen, and the associated cost $\rho_j=(x_i-c_j)^2$ is calculated. Each branch in the ith stage of the trellis that is labeled with subset $D_j$ is assigned cost $\rho_j$. The Viterbi algorithm described in The Viterbi algorithm by Forney, Jr., Proc. IEEE, vol. 61, March 1973, which is hereby incorporated by reference, is then used to find the path through the trellis with the lowest overall cost.

The codeword labels (as described above) can be noiselessly compressed using one variable length code for each superset. The encoding rate achievable by this process is the conditional entropy of the codebook C, given the superset:

$$H(C|A) = \Sigma_{i=0,1} \Sigma_{c \in A_i} P(c|A_i) P(A_i) \log_2 P(c|A_i)$$

For a codebook of size $2^{R+1}$ (as discussed above) this noiseless compression causes the encoding rate to fall below R bits/sample. Thus, the size of the codebook should be increased. Procedures for designing optimum codebooks for a given encoding rate are discussed in On Entropy-Constrained Trellis-Coded Quantization by Marcellin, IEEE Trans. Commun., vol. 42, January 1994, and Entropy-Constrained Trellis-Coded Quantization by Fischer et al., IEEE Trans. Inform, Th., vol 38, March, 1992, which are both hereby incorporated by reference.

For encoding the memoryless Gaussian source, it can be shown that an 8-state entropy-constrained system comes within 0.5 dB of the rate-distortion function for all nonnegative rates. Further, our experimentation has shown that similar performance is achievable with various generalized Gaussian distributions.

FIG. 2 is a block diagram illustrating a hyperspectral image encoder 20 in accordance with one embodiment of the present invention. The hyperspectral image encoder 20 includes: a subtractor 21, a two-dimensional DCT decomposition unit 22, a trellis coded quantization (TCQ) encoder 23, a TCQ decoder 24, a two-dimensional DCT reconstruction unit 25, an adder 26, and an interband predictor 27. Subtractor 21 is operative for finding a difference between a present input image $x_n$ and its predicted value $\tilde{x}_{n|n-1}$ (where the tilde indicates a predicted value). The subtractor 21 outputs an error image $\epsilon_n$, which is received by the two-dimensional DCT decomposition unit 22.

The DCT decomposition unit 22 divides the image into non-overlapping 8×8 blocks and computes the two-dimensional DCT of each block. After the error image $\epsilon_n$ is divided into blocks, one or more blocks are classified into one of J classes in a manner that maximizes the coding gain. DCT coefficients corresponding to the same position within each block belonging to the same class (like coefficients) are grouped together into sequences to be quantized using entropy-constrained trellis coded quantization in the TCQ encoder 23. The output of the TCQ encoder 23 represents the coded (i.e., compressed) hyperspectral imagery.

As discussed previously, to determine the error image $\epsilon_n$, a predicted image corresponding to the current iteration is subtracted for the current input image. To predict the next image, it is first necessary to reconstruct an approximation $\hat{x}_n$ of the current image from the coded output signal. The TCQ decoder 24 receives the coded output signal from the TCQ encoder 23 and performs an inverse quantization function on the signal. The resulting signal is then input into the two-dimensional DCT reconstruction unit 25 where the quantized DCT coefficients are reassembled into an error image estimate $\hat{\epsilon}_n$. Because the original error image $\epsilon_n$ had been quantized in the TCQ encoder 23, with an associated loss of information, the error image estimate $\hat{\epsilon}_n$ may not be an exact replica of the error image $\epsilon_n$ originally input into the two-dimensional DCT decomposition unit 22. The adder 26 adds the error image estimate $\hat{\epsilon}_n$ to the predicted image $\tilde{x}_{n|n-1}$ to produce image estimate $\hat{x}_n$. The interband predictor 27 operates on the image estimate $\hat{x}_n$ to determine the predicted next image $\tilde{x}_{n|n-1}$ for the next iteration.

The hyperspectral image encoder 20 of FIG. 2 incorporates a DPCM loop 28 for performing decorrelation in the spectral domain with a discrete cosine transform processing means 29 for performing decorrelation in the spatial domain. This unique combination of decorrelation methods has been found to provide enhanced compression of hyperspectral imagery. Because the DCT processing means 29 operates on error images, rather than on individual hyperspectral image bands, significant data compression is realized. That is, the error image $\epsilon_n$ will, on average, be significantly smaller in magnitude than the input image $x_n$. Accordingly, fewer quantization bits are required to encode the error sequence than would be required to encode the original sequence of images.

As discussed above, the two-dimensional DCT decomposition unit 22 outputs 8×8 blocks of DCT coefficients in the preferred embodiment. These blocks of DCT coefficients are next processed in the TCQ encoder 23. Each block is classified into one of J classes (e.g., two classes) by maximizing the coding gain. DCT coefficients corresponding to the same position within each block belonging to the same class (like coefficients) are grouped together into sequences to be quantized using entropy-constrained trellis coded quantization in the TCQ encoder 23. FIG. 3 is a block diagram illustrating the TCQ encoder 23 of FIG. 2 in one embodiment of the present invention. As illustrated, the TCQ encoder 23 includes: an energy calculation unit 30, a classification unit 31, a statistics calculation unit 32, a Q scalar quantization unit 33, a normalization unit 34, a TCQ trellis 35, and a rate allocation unit 36.

The energy calculation unit 30 computes the energy of each DCT coefficient block i as follows:

$$\sigma_i^2 = \frac{1}{L-1} \sum_{j=1}^{L} (x[j])^2$$

where L is the number of elements in each block (e.g., L=64 for 8×8 blocks).

The classification unit 31 is operative for classifying blocks into a plurality of classes. In the preferred embodiment, the classification method that is used is of the type described in Optimum Classification in Subband Coding of Images, by Joshi et al., Proc. International Conference on Image Processing, November 1994, which is hereby incorporated by reference. The method is a pairwise maximization of coding gain and is illustrated in the flowchart of FIG. 4.

The flowchart assumes a source X of length NL divided into N blocks of L consecutive samples, with each block assigned to one of J classes. In the preferred embodiment, the source X represents the collection of DCT blocks output by the DCT decomposition unit 22. If the samples from all blocks assigned to class i ($1 \leq i \leq J$) are grouped into source $X_i$, the total number of blocks assigned to source $X_i$ is $N_i$. Let $\sigma_i^2$ be the variance of $X_i$ and $p_i$ be the probability that a sample belongs to $X_i$ (i.e., $p_i = N_i/N$, $1 \leq i \leq J$).

Figure 4:
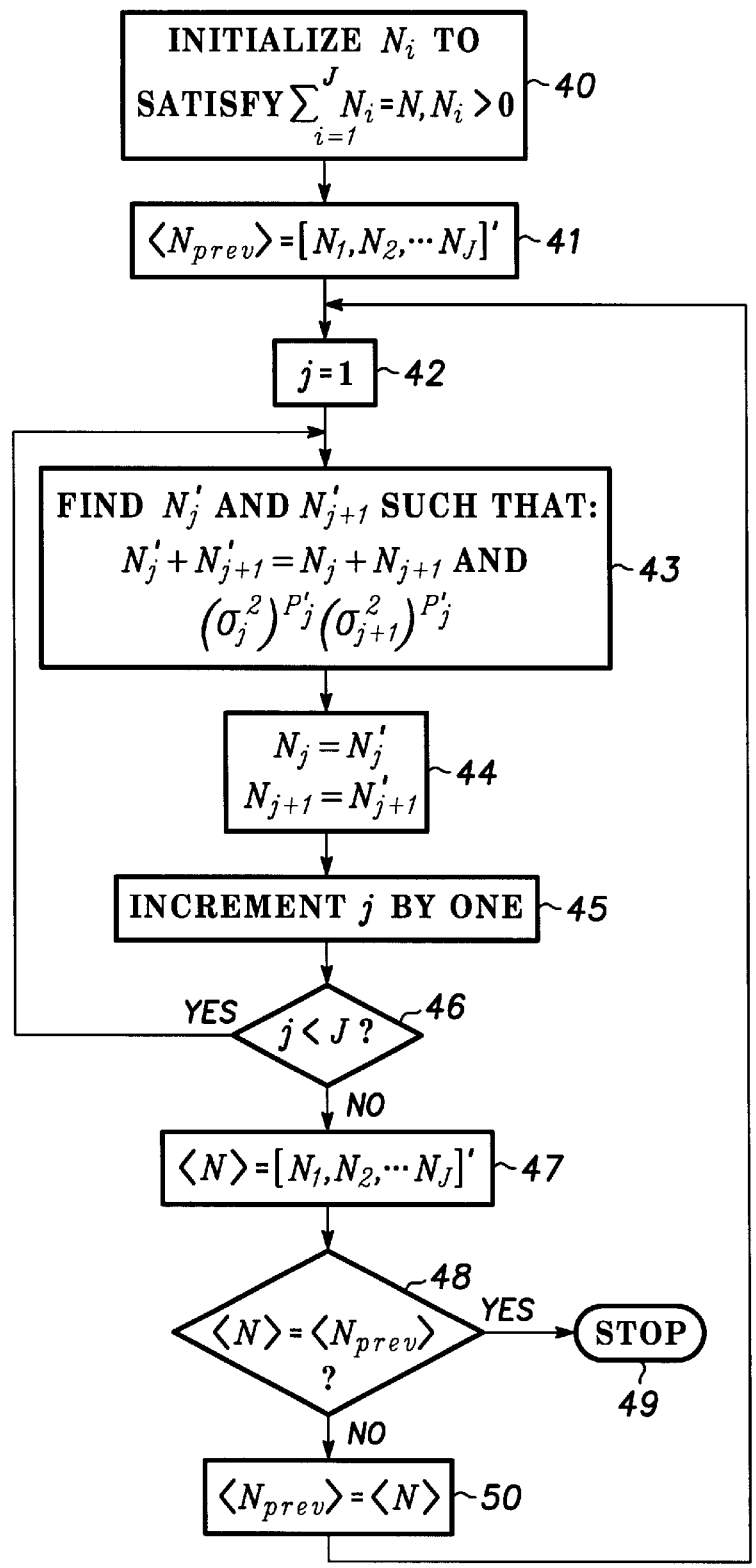
FIG. 4 is a flowchart illustrating a method for performing classification of signal blocks in accordance with one embodiment of the present invention.

With reference to FIG. 4, the method starts by initializing each $N_i$ (i.e., $N_1, N_2, \ldots N_J$) to satisfy the following equation:

$$\sum_{i=1}^{J} N_i = N \text{ for } 1 \leq i \leq J.$$

where $N_i > 0$ (step 40). The results of the initialization are then formed into a vector $<N_{prev}>$ as follows (step 41):

$$<N_{prev}> = [N_1, N_2, \ldots, N_J]$$

Next, an index j is initialized to 1 (step 42). Values for $N_j'$ and $N_{j+1}'$ are now found such that $N_j' + N_{j+1}' = N_j + N_{j+1}$ and $(\sigma_j^2)^{p'j}(\sigma_{j-1}^2)^{p'j}$ is minimized (step 43). After values are found for $N_j'$ and $N_{j+1}'$, they are used to replace the original values $N_j$ and $N_{j+1}$, respectively (step 44). Next, the index j is incremented by 1 (step 45) and is compared to the number of classes J (step 46). If j is less than J, the method returns to step 43 and values are found for $N_j'$ and $N_{j+1}'$ using the incremented index. If j is not less than J, then a new vector <N> is formed (step 47) as follows:

$$N = [N_1, N_2, \ldots, N_J]^t$$

The vector <N> is next compared to the vector <$N_{prev}$> (step 48) and, if they are the same, the classification method is stopped (step 49). If the vectors are not the same, the vector <$N_{prev}$> is made equal to the vector <N> (step 50) and the classification method returns to step 42 where the index j is reinitialized. The method is then repeated for all values of index j. After the classification method has ended, each of the blocks from the source $X_i$ has been appropriately classified. The classification maps for the hyperspectral sequence must be transmitted. In a preferred embodiment, one map is used for every ten spectral bands. Each map requires 1024 bits for J=2, or 2048 bits for J=4. Averaged over ten spectral bands, this corresponds to 0.00156 bits per pixel (bpp) and 0.00313 bpp for J=2 and J=4, respectively.

The statistics calculation unit 32 computes the mean, variance, and Kurtosis values of all like-coefficient sequences assigned to the same class as follows:

$$\text{Kurtosis} = \sum_{i=1}^{N_j} (x[i])^4 / (\sigma_x^2)^2, \text{ for each class } j$$

where x[i] represents samples within each like-coefficient sequence classified into a particular class j, and $N_j$ is the number of samples within each sequence, and $$\text{variance} = \sigma_i^2 = \frac{1}{N_j - 1} \sum_{i=1}^{N_j} (x[i] - \mu)^2$$

and the mean of the sequence if defined as $$\text{mean} = \mu = \left[\sum_{i=1}^{N_j} x[i]\right] / N_j$$

The standard deviation of a sequence is also defined as the square root of the variance:

$$\text{Standard deviation} = \sigma_x = \sqrt{\sigma_x^2}$$

The above operations result in a number of mean, variance, and Kurtosis values that is equal to the product of the number of DCT coefficients per block and the number of classes J (e.g., 128 mean, variance, and Kurtosis values for 8×8 blocks and J=2 classes).

The Q scalar quantization unit 33 quantizes the standard deviations and the means from the statistics calculation unit 32. In the preferred embodiment, 16 bit uniform scalar quantizers are used, which corresponds to $2^{16}$ or 65,536 quantization levels. The Kurtosis values are quantized to one of five values.

The normalization unit 34 receives each like-coefficient sequence, along with the quantized standard deviation and mean values, and subtracts the sequence mean from the sequence, and divides each sequence by its respective standard deviation to obtain a sequence with unit variance and zero mean.

The rate allocation unit 36 receives the quantized Kurtosis values, the quantized standard deviation values, and rate distortion tables, and calculates rate assignments for the corresponding sequences. In the preferred embodiment, rate allocation is performed by using the method described in Efficient Bit Allocation for an Arbitrary Set of Quantizers by Shoham et al., IEEE Trans. Acoust., Speech, and Signal Proc., vol. 36, September 1988, which is hereby incorporated by reference. The overall mean square error (MSE) incurred by encoding the coefficient sequences using entropy-constrained trellis coded quantization (ECTCQ) at an average rate of $R_s$ bits/coefficient is represented by:

$$E_s = \Sigma_{i=1,K} \alpha_i \sigma_i E_{ij}(r_i)$$

where $\sigma_i$ is the variance of sequence i, $E_{ij}(r_i)$ denotes the rate-distortion performance of the $j^{th}$ quantizer (i.e., the quantizer corresponding to the Kurtosis of sequence i) at $r_i$ bits/sample, K is the number of data sequences, and $\alpha_i$ is a weighting coefficient to account for the variability in sequence length. For 8×8 blocks and J classes, K=64J.

The rate allocation vector B=$(r_1, r_2, \ldots, r_K)$ is chosen such that $E_s$ is minimized, subject to an average rate constraint:

$$\Sigma_{i=1,K} \alpha_i r_i \leq R_s \text{ bits/coefficient.}$$

It has been shown that the solution B*$(r_1^*, r_2^*, \ldots, r_K^{**})$ to the unconstrained problem:

$$\min B\{\Sigma_{i=1,K}(\alpha_i \sigma_i^2 E_{ij}(r_i) + \lambda \alpha_i r_i)\}$$

minimizes $E_s$ subject to $\Sigma_{i=1,K} \alpha_i r_i \leq \Sigma_{i=1,K} \alpha_i r_i^*$. Thus, to find a solution to the constrained problem, it suffices to find $\lambda$ such that the solution to the above equation yields $\Sigma_{i=1,K} \alpha_i r_i^* \leq R_s$. Procedures for finding the appropriate $\lambda$ are given in Efficient Bit Allocation for an Arbitrary Set of Quantizers by Shoham et al., IEEE Trans. Acoust., Speech, and Signal Proc., vol. 36, September 1988, which is hereby incorporated by reference.

For a given $\lambda$, the solution to the unconstrained problem is obtained by minimizing each term of the above sum separately. If $S_j$, is the set of allowable rates for the $j^{th}$ quantizer, and $r_i^*$ is the $i^{th}$ component of the solution vector B*, then $r_i^*$ solves:

$$\min r_i \in S_j\{\alpha_i \sigma_i^2 E_{ij}(r_i) + \lambda \alpha_i r_i\}.$$

The TCQ trellis 35 receives the normalized DCT like-coefficient sequences, the quantized Kurtosis values, and the rate assignments, and uses them to generate quantization indices that represent the coded output signals of the TCQ encoder 23. FIG. 1 illustrates a typical TCQ trellis for performing this function. The particular trellis coded quantizer used (i.e., the specific rate and the appropriate generalized Gaussian optimized codebook) is determined by the rate allocation procedure and the Kurtosis of the sequence.

The probability distribution of each sequence to be encoded is modeled by the so-called Generalized Gaussian Distribution (GGD), whose probability density function (pdf) is given by $$f_X(x) = \left[\frac{\alpha \eta(\alpha, \sigma)}{2\Gamma(1/\alpha)}\right] \exp\{-[\eta(\alpha, \sigma)|x|]^\alpha\}$$

where $$\eta(\alpha, \sigma) \equiv \sigma^{-1} \left[ \frac{\Gamma(3/\alpha)}{\Gamma(1/\alpha)} \right]^{1/2}$$

The shape parameter a describes the exponential rate of decay, and $\sigma$ is the standard deviation of the associated random variable. The gamma function $\Gamma(.)$ is defined as:

$$\Gamma(n) = \int_0^\infty e^{-x} x^{n-1} dx$$

Figure 5:
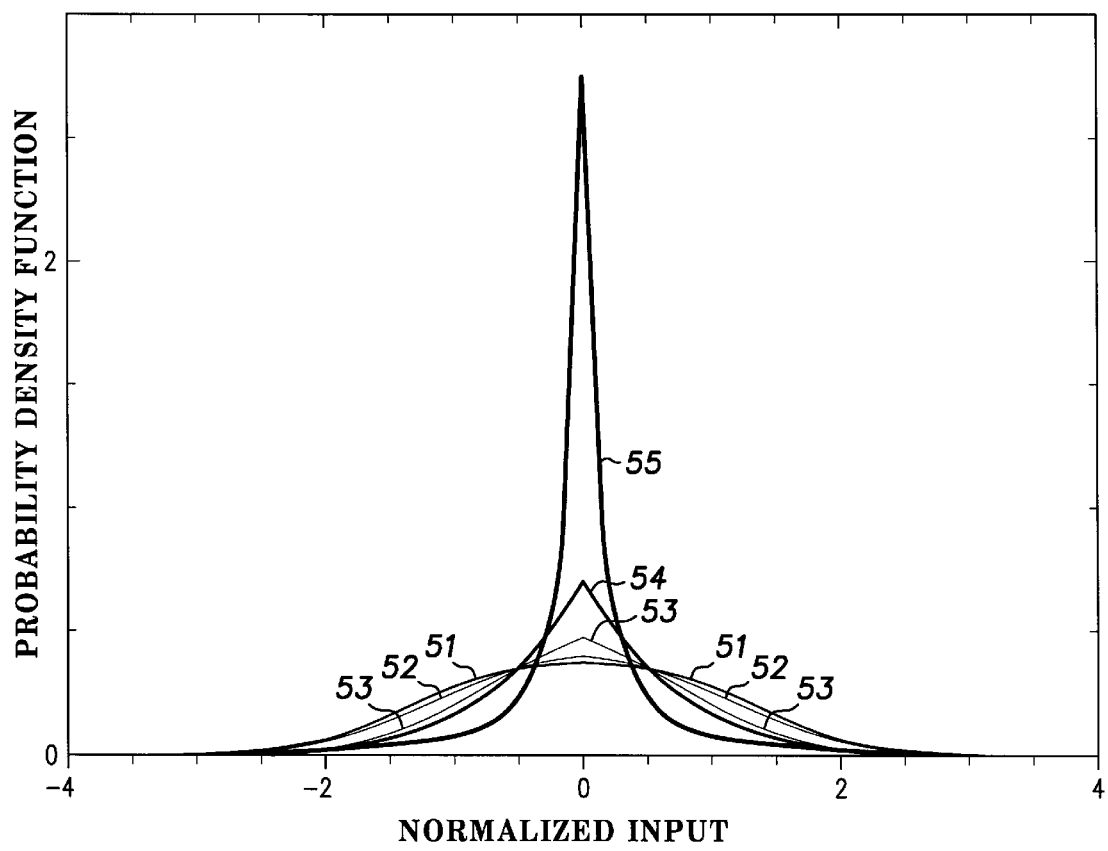
FIG. 5 is a diagram illustrating probability density functions associated with various generalized Gaussian distributions.

Distributions corresponding to $\alpha=1.0$ and 2.0 are Laplacian and Gaussian, respectively. FIG. 5 shows generalized Gaussian pdfs corresponding to $\alpha=0.5$ (55), 1.0 (54), 1.5 (53), 2.0 (52), and 2.5 (51).

It can be shown that:

$$E[X^4] = \int_{-\infty}^\infty x^4 f_X(x) dx = K\sigma^4 \text{ or}$$

$$K = \frac{E[X^4]}{\sigma^4} = \frac{\Gamma(5/\alpha)\Gamma(1/a)}{\Gamma(2/\alpha)\Gamma(3/a)}$$

where K is the fourth central moment, or Kurtosis. Recall that the Kurtosis is a measure of the peakedness of a given distribution. If a pdf is symmetric about its mean and is very flat in the vicinity of its mean, the coefficient of Kurtosis is relatively small. Similarly, a pdf that is peaked about its mean has a large Kurtosis value.

Figure 6:
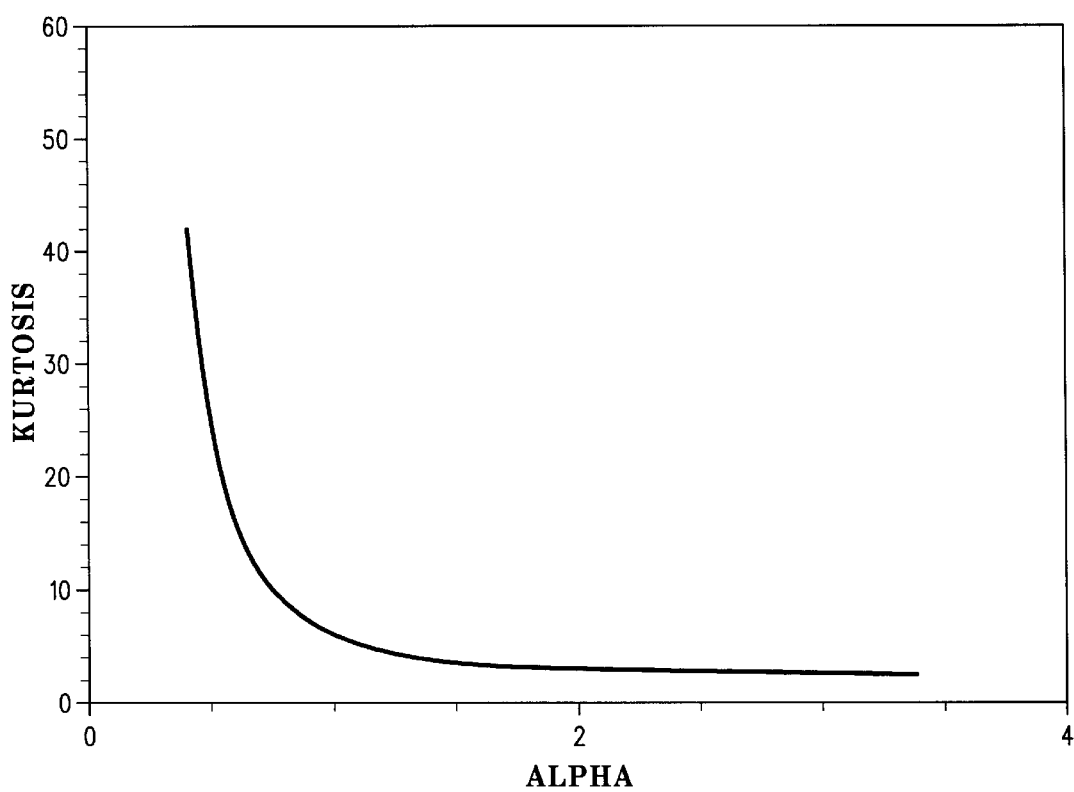
FIG. 6 is a diagram illustrating the mathematical relationship between the Kurtosis of a sequence and the parameter describing its probability distribution.

The sample Kurtosis of any sequence can be calculated easily and used as a measure by which the distribution of the sequence can be determined. FIG. 6 shows the relationship between the shape parameter a and K. This graph is used to determine the appropriate a for a particular sequence.

Codebooks were designed for generalized Gaussian distributions with a values of 0.5, 0.75, 1.0, 1.5, and 2.0, using the algorithm in On Entropy-Constrained Trellis Coded Quantization by Marcellin, IEEE Trans. Commun., vol. 42, January 1994, which is hereby incorporated by reference. It can be shown that for the Gaussian distribution, optimum codebooks do not yield significant MSE improvement over uniform codebooks at rates greater than 2.5 bits/sample. Experimentation revealed that this is also true for $\alpha=1.5$ and $\alpha=1.0$. However, for $\alpha=0.75$, optimum codebooks are superior up to 3.0 bits/sample, while for $\alpha=0.5$, optimum codebooks should be used up to 3.5 bits/sample. Accordingly, for ax values of 2.0, 1.5, and 1.0, optimum codebooks were designed in one-tenth bit increments up to 2.5 bits/sample, while for $\alpha=0.75$ and $\alpha=0.5$, optimum codebooks were designed in one-tenth bit increments up to 3.0 and 3.5 bits/sample, respectively. Thereafter, uniform codebooks were designed in one-tenth bit increments up to 12 bits/sample. Training sequences consisted of 100,000 samples derived from generalized Gaussian pseudo random number generators, each tuned to the appropriate $\alpha$ value.

Operation of the TCQ decoder unit 24 and the DCT reconstruction unit 25 are essentially the reverse of the operations of the TCQ encoder 23, and the DCT decomposition unit 22 described above, respectively.

The DCT reconstruction unit 25 outputs error image estimate $\hat{\epsilon}_n$. The adder 26 receives the error image estimate $\hat{\epsilon}_n$ and the predicted image $\tilde{x}_{n|n-1}$ from the interband predictor 27 and adds the two signals to derive an estimate of the present input image $\hat{x}_n$. The interband predictor 27 receives the image estimate $\hat{x}_n$ and uses the estimate to predict the next image at the input of the hyperspectral image encoder 20. It can be shown that for a non-zero-mean input sequence, the optimum (i.e., minimum mean square error (MSE)) first-order linear predictor is given by the following equation:

$$\tilde{x}_{i|i-1} = \rho x_{i-1} + \mu(1-\rho)$$

where $\tilde{x}_{i|i-1}$ is the predicted value of $x_i$, $\mu$ is the mean, and $\rho$ is the correlation coefficient of the sequence. In a preferred embodiment of the invention, a spectral correlation coefficient of 0.95 is used in the DPCM loop 28.

This entropy-constrained system achieves a compression ratio of greater than 70:1 with an average PSNR of the coded hyperspectral sequence approaching 41 dB.

What is claimed is:

1. An image encoding method, comprising the steps of:
   providing a plurality of hyperspectral images, each of said plurality of hyperspectral images including a plurality of hyperspectral image bands;
   generating a prediction image of one of said plurality of hyperspectral image bands;
   forming an error image of differences between the prediction image and one of said plurality of hyperspectral image bands;
   compressing the error image with a discrete cosine transform of a plurality of spatial blocks of the error image;
   classifying each of the plurality of spatial blocks into one of a plurality of classes;
   collecting into a sequence coefficients corresponding to a same position in a spatial block for each block in a class in the plurality of classes within a band; and
   iterating the step of collecting for each class in the plurality of classes.

2. An image encoding method as claimed in claim 1, wherein there is further included the steps of:
   determining a mean and variance for said sequence; and
   iterating said step of determining a mean and a variance for each of a plurality of sequences.

3. An image encoding method as claimed in claim 2, wherein there is further included the step of normalizing each of said plurality of sequences according to said mean and to a standard deviation of each of said plurality of sequences.

4. An image encoding method as claimed in claim 3, wherein there is further included the steps of:
   determining a Kurtosis for each of said plurality of sequences; and
   iterating the step of determining a Kurtosis for each of said plurality of sequences.

5. An image encoding method as claimed in claim 4, wherein there is further included the steps of using the Kurtosis as a measure to determine one of a plurality of generalized Gaussian distributions.

6. An image encoding method as claimed in claim 5, wherein there is further included the step of determining a rate allocation using the variance of each of said plurality of sequences and using the one of said plurality of generalized Gaussian distributions determined from the Kurtosis and using a set of rate distortion performance tables.

7. An image encoding method as claimed in claim 6, wherein there is further included the steps of:
   first quantizing the mean and the standard deviation for each of said plurality of sequences; and
   iterating said step of quantizing the mean and the standard deviation for each of the plurality of sequences.

8. An image encoding method as claimed in claim 7 wherein the step of first quantizing further includes the step of quantizing the mean and the standard deviation with a uniform scalar quantizer.

9. An image encoding method as claimed in claim 7, wherein there is further included the step of second quantizing each of said plurality of sequences using a trellis coded quantizer to produce a plurality of codebook quantization indices.

10. An image encoding method as claimed in claim 9, wherein said step of second quantizing includes the step of quantizing each sequence using an entropy constrained trellis coded quantizer.

11. An image encoding method as claimed in claim 9, wherein there is further included the step of choosing codebook quantization indices based upon the determined generalized Gaussian distribution and based upon one of plurality of bit rates.

12. An image encoding method as claimed in claim 11, wherein there is further included the step of encoding each of the plurality of sequences using the chosen codebook quantization indices.

13. An image encoding method as claimed in claim 12, wherein the step of encoding includes the step of entropy encoding each of the plurality of sequences using the chosen codebook quantization indices.

14. An image encoding method as claimed in claim 12, wherein the step of encoding includes the step of adaptive arithmetic encoding the plurality of sequences using the chosen codebook quantization indices.

15. An image encoding method as claimed in claim 1, wherein the step of classifying each of the spatial blocks into one of a plurality of classes includes the step of classifying each of the plurality of spatial blocks into one of a plurality of energy levels.

16. An image encoding method as claimed in claim 1, wherein there is further included the step of iterating the steps of providing, generating, forming, compressing and classifying for a predetermined number of hyperspectral image bands.

17. An image encoding method as claimed in claim 1, wherein there is further included the step of repeating the collecting and iterating step for each position in a spatial block.

18. An image encoding method as claimed in claim 1, wherein the classification of each of the plurality of spatial blocks into one of a plurality of classes is performed by pairwise maximization of coding gain.

19. An image encoding method as claimed in claim 15, wherein there is further included the steps of:

collecting into a sequence coefficients corresponding to a same position in a spatial block for each block in a class in the plurality of classes; and iterating the step of collecting for each class in the plurality of classes.

20. An image encoding method as claimed in claim 19, wherein the step of classifying each of the plurality of spatial blocks into one of a plurality of energy levels includes the step of using a calculated energy level of each coefficient in order to improve signal to noise ratio.

* * * * *

UNITED STATES PATENT AND TRADEMARK OFFICE
CERTIFICATE OF CORRECTION

PATENT NO.     : 6,535,647 B1
DATED          : March 18, 2003
INVENTOR(S)    : Glen Patrick Abousleman It is certified that error appears in the above-identified patent and that said Letters Patent is hereby corrected as shown below:

<u>Column 5,</u>
Line 1, delete "$(\sigma_{j-1}{}^2)^{p'j}$" and insert -- $(\sigma_{j+1}{}^2)^{p'j}$ --

<u>Column 7,</u>
Lines 6, 35, 36 and 38, delete "a", and insert -- $\alpha$ --
Line 49, delete "ax", and insert -- $\alpha$ --

<u>Column 8,</u>
Line 8, delete "a", and insert -- $\alpha$ --

Signed and Sealed this

Seventeenth Day of June, 2003

JAMES E. ROGAN
*Director of the United States Patent and Trademark Office*